United States Patent [19]

Teramoto et al.

[11] Patent Number: 4,810,771
[45] Date of Patent: Mar. 7, 1989

[54] HEAT-RESISTANT CO-POLYESTER FROM 9,9-BIS(4-HYDROXY-PHENYL)FLUORENE

[75] Inventors: Takero Teramoto; Takashi Usami, both of Kawasaki, Japan

[73] Assignees: Nippon Steel Corporation; Nippon Steel Chemical Co., Ltd., Tokyo, Japan

[21] Appl. No.: 210,738

[22] Filed: Jun. 23, 1988

[30] Foreign Application Priority Data

Jun. 24, 1987 [JP] Japan ............................. 62-155349

[51] Int. Cl.⁴ ......................... C08G 63/18; C08J 5/18
[52] U.S. Cl. ................................. 528/298; 528/302
[58] Field of Search ........................... 528/298, 302

[56] References Cited

U.S. PATENT DOCUMENTS 3,546,165 12/1970 Morgan .
3,738,968 6/1973 Ridgway .......................... 528/338

OTHER PUBLICATIONS

Macromolecule 3,536 (1970) Jan. 5, 1970.

*Primary Examiner*—Harold D. Anderson
*Assistant Examiner*—T. Mason

[57] ABSTRACT

A heat-resistant polyester having a structure represented by the formula (I):

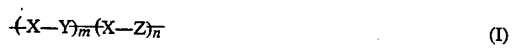

wherein X represents the structure (A):

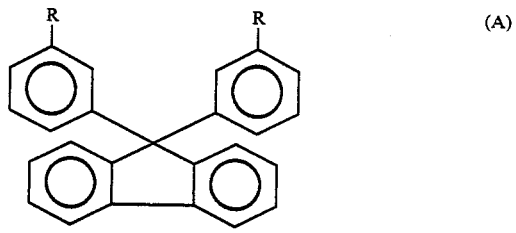

wherein R represents hydrogen, methyl, or ethyl, Y represents the structure (B):

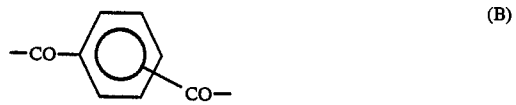

Z represents the structure (C):

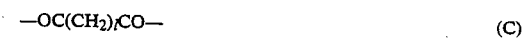

wherein l is an integer of 2 to 6, and m and n are independent repeating numbers, the mole ratio of Y component and Z component in the formula (I) being 1/99 to 99/1 and said polyester having an inherent viscosity ($\eta_{inh}$) of at least 0.6 dl/g as determined at a temperature of 30° C. in a solution of 0.5 g of the polyester in 100 ml of a mixture of 60% by weight of phenol and 40% by weight of 1,1,2,2-tetrachloroethane.

4 Claims, 1 Drawing Sheet

HEAT-RESISTANT CO-POLYESTER FROM 9,9-BIS(4-HYDROXY-PHENYL)FLUORENE

BACKGROUND OF THE INVENTION

1. Field of the Invention

The present invention relates to a novel heat-resistant polyester having a specific heat resistance and moldability or processability.

2. Description of the Related Art

Various proposals have been made for the production of polyesters from the starting material 9,9-bis(4-hydroxyphenyl)fluorene. For example, polyesters derived from 9,9-bis(4-hydroxyphenyl)fluorene and terephthalic acid or isophthalic acid are reported in Macromolecule 3,536 (1970), and polyesters derived from 9,9-bis(4-hydroxyphenyl)fluorene and a 3:7 to 7:3 mixture of terephthalic acid and isophthalic acid are reported in JP-A-No. 57-192432).

Furthermore, single polyesters derived from 9,9-bis(4-hydroxyphenyl)fluorene and isophthalic acid or a fatty acid are reported in U.S. Pat. No. 3546165. Although this patent describes the use of terephthalic acid/isophthalic acid (mole ratio=20/80) or terephthalic acid/sebacic acid (mole ratio=60/40), it does not describe the formation of a film.

The present inventors studied these reports, but found that the resultant polymers have disadvantages in that the polymerization degree of each resultant polymer is low, and only a white turbid solution is obtained because, when the polymer is dissolved in a solvent, a portion of the polymer is dissolved therein, and a film having a good appearance and good quality cannot be obtained by casting.

Furthermore, when injection, extrusion, compression, and other molding processes are applied to those polymers, molding is possible only when the processing is carried out at a higher temperature, which causes, for example, decomposition. In particular, the above-mentioned polymer is difficult to use in injection molding.

SUMMARY OF THE INVENTION

Accordingly, the objects of the present invention are to eliminate the above-mentioned disadvantages of the prior art and to provide a novel heat-resistant polyester having an excellent moldability or processability by including a diol and a mixture of phthalic acid and a fatty acid as components thereof.

Other objects and advantages of the present invention will be apparent from the following description.

In accordance with the present invention, there is provided a heat-resistant polyester having a structure represented by the formula (I):

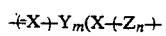
(I)

wherein X represents the structure (A):

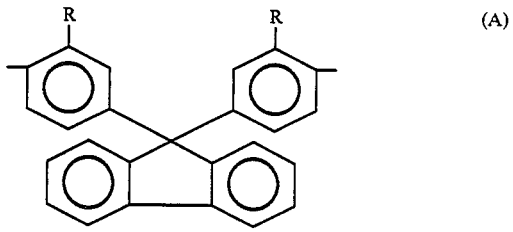

wherein R represents hydrogen, methyl, or ethyl,
Y represents the structure (B):

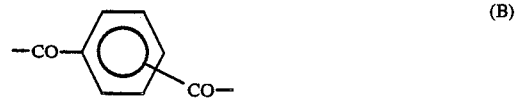

Z represents the structure (C):

wherein l is an integer of 2 to 6, and
m and n are independent repeating numbers, the mole ratio of Y component and Z component in the formula (I) being 1/99 to 99/1 and said polyester having an inherent viscosity ($\eta_{inh}$) of at least 0.6 dl/g as determined at a temperature of 30° C. in a solution of 0.5 g of the polyester in 100 ml of a mixture of 60% by weight of phenol and 40% by weight of 1,1,2,2-tetrachloroethane.

BRIEF EXPLANATION OF THE DRAWING

The present invention will now be explained in detail with reference to the attached drawing of FIG. 1, which illustrates the correlation between a mole ratio of terephthalic acid/adipic acid and the glass transition temperature A or the decomposition initiating temperature B obtained from the thermal analysis of polyester obtained in the Example according to the present invention.

DESCRIPTION OF THE PREFERRED EMBODIMENT

Figure 1:
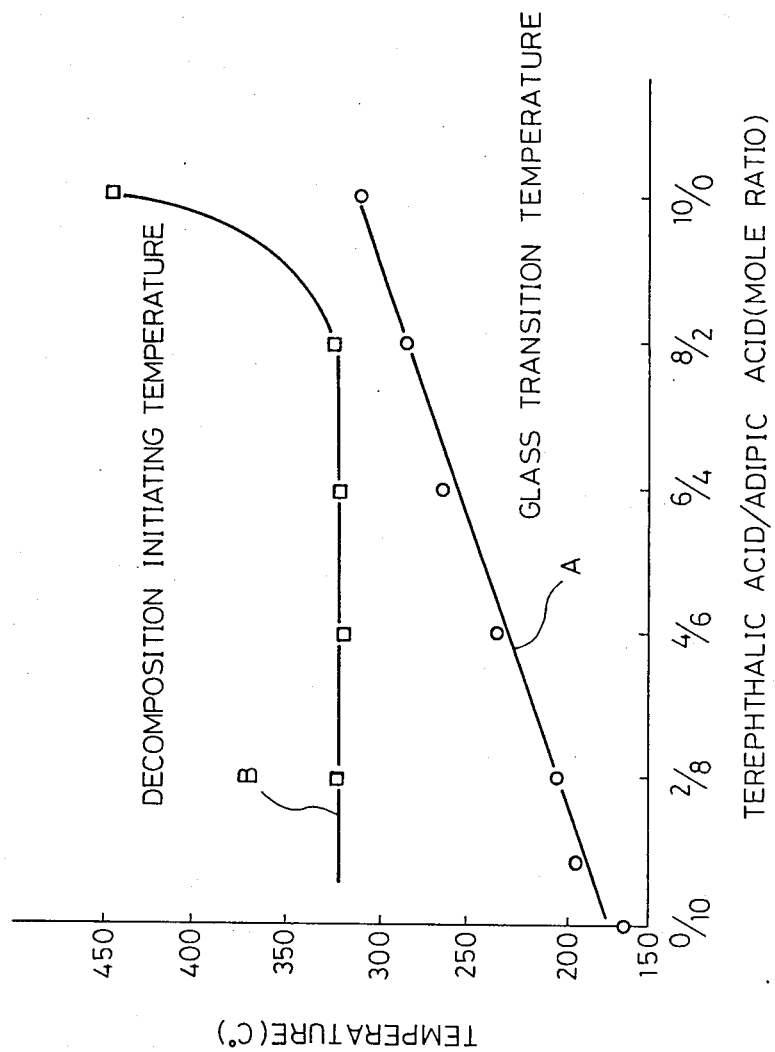

The polyesters according to the present invention contain a diol component and an acid mixture component composed of terephthalic acid and/or isophthalic acid and a fatty acids(s), wherein the mole ratio of the phthalic component to the fatty acid component is 1/99 to 99/1. Note, polyesters having a mole ratio of telephthalic acid to adipic acid of 1/99 to 60/40 exhibit the most desirable properties or characteristics for the present invention.

The polyesters according to the present invention have a glass transition temperature (Tg) of 170° C. to 320° C., an inherent viscosity of 0.6 dl/g or more, and a high degree of polymerization. In general, when the molded product is formed by heating, the necessary temperature difference between the decomposition temperature (Td) and the glass transition temperature is about 50° C. or more. The polyesters according to the present invention satisfy this requirement and, furthermore, since the Tg can be controlled by changing a mixing ratio of the carboxylic acids, the present polyesters can be preferably used as an injection molding material. In addition, since the present polyesters have excellent electric properties and the like, the polyesters can be preferably used in the fields of, for example, electrical connectors and electric parts of a microwave oven and the like. Furthermore, the present polyesters may be utilized as a heat-resistant adhesive. Note, the applications of the present polyesters are not limited to the above-mentioned fields.

The diols usable in the present invention are those having the formula:

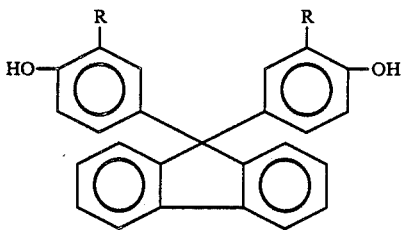

wherein R is H, CH3, or $C_2H_5$. Typical examples of such diols are 9,9-bis(4-hydroxyphenyl)fluorene, 9,9-bis(3-methyl-4-hydroxyphenyl)fluorene, 9,9-bis(3-ethyl-4-hydroxyphenyl)fluorene, and the like.

The carboxylic acids usable as the carboxylic acid component in the present invention may include aromatic carboxylic acids such as terephthalic acid and/or isophthalic acid and aliphatic carboxylic acids are those having the formula: $HOOC(CH_2)_lCOOH$, wherein l is 2 to 6, e.g., succinic acid, glutaric acid, adipic acid, pimeric acid, and suberic acid. Of these carboxylic acids, preferably adipic acid is used.

To maintain the decomposition temperature at as high a level as possible, and to control the glass transition temperature, preferably the above-mentioned aliphatic carboxylic acids are used. When the aliphatic chain of the aliphatic carboxylic acids is too long, the decomposition temperature is lowered, and when the aliphatic chain is too short, the glass transition temperature is not lowered to a desired level.

The mole ratio of the aromatic acid to the aliphatic acid in the present invention should be 1/99 to 99/1, for the following reasons. One object of the present invention is that the polyesters are moldable, e.g., injectable, extrudable, and compression moldable, by decreasing the Tg by including the specified amount of the aliphatic acids in the terephthalic acid and/or isophthalic acid. When the aliphatic acid component is included, the Tg is decreased but the Td is not decreased. Furthermore, when the aliphatic acid component is introduced, the flexibility is increased when a film is being formed, and the adhesion power and the handling properties are improved in the case of the adhesives. The present inventors found the difference between the above-mentioned tendency of Tg and Td, and effectively applied this finding to the production of the heat-resistant polyesters of this invention.

FIG. 1 illustrates one example of the thermal analysis data of the polyester (i.e., terephthalic acid-adipic acid), wherein the ratios of terephthalic acid-adipic acid are plotted on the abscissa axis and the temperatures are plotted on the ordinate axis, to show the glass transition temperature curve A and the decomposition initiation temperature curve B.

As shown in FIG. 1, when the mole ratio of terephthalic acid/adipic acid is increased, the glass transition temperature is linearly increased. Conversely, the decomposition initiating temperature is substantially constant at a mole ratio of the terephthalic acid/adipic acid of 80/20 to 10/90, but when the mole ratio is more than 80/20, the decomposition initiating temperature is rapidly raised.

Accordingly, when the mole ratio of terephthalic acid/adipic acid is more than about 60/40, the injection molding temperature is higher than the preferable temperature, i.e., the glass transition temperature +50° C., and therefore, the polyester is usually decomposed during injection molding. Consequently, polyesters having a mole ratio of terephthalic acid/adipic acid of 1/99 to 60/40, especially 1/99 to 40/60 or less are preferable as a molding material.

Furthermore, the polyesters according to the present invention are useful not only as the molding material, but also as a heat-resistant adhesive. Namely, depending upon the adhesion methods or the places or portions to be adhered, polyesters having varying ratios of the aromatic carboxylic acid to the aliphatic carboxylic acid may be used.

The production process of the present polyesters will now be explained.

The starting diols are dissolved in water by adding an alkali to form an aqueous solution. Although there are no limitations to the type of alkali, a hydroxide of alkali metals such as sodium hydroxide is preferably used. The advantageous concentration of the aqueous alkaline solution is 2% by weight or less, especially about 0.8% to 1.5% by weight. The diols are added to the aqueous alkaline solution to obtain the desired aqueous alkaline solution of the diols.

As the acid component, the chloride of each carboxylic acid is preferably used. The acid chlorides may be dissolved in organic halogen compounds such as 1,2-dichloroethane, chloroform, and trichloroethane to form the organic solvent solutions of the acid component.

Thereafter, the aqueous alkaline solution of the diols and the organic solvent solution of the acid component are subjected to interfacial polycondensation while stirring. Since the interfacial polycondensation reaction is carried out at the interface of the two solutions, the reaction is preferably accelerated when a surfactant is added to the aqueous alkaline solution of the diols in an amount such that the system is not emulsified.

Examples of such surfactants are those which do not react with the diols or the acid chlorides or the other acid components and which can withstand the alkali, because the surfactant is added to the aqueous alkaline solution. Preferable surfactants are cationic surfactants such as tetraalkyl (e.g., $C_1$-$C_6$ alkyl) ammonium halide (e.g., chloride, bromide, iodide) and trialkyl (e.g., $C_1$-$C_6$ alkyl) benzyl ammonium halide (e.g., chloride, bromide, iodide). Although the amount of the surfactant to be added is not critically limited and may be varied depending upon, for example, the type of surfactant, the amount usually used in the interfacial polymerization, is 5% by weight or less, more preferably 2% by weight or less, in the aqueous solution. The use of too large an amount of the surfactant unpreferably results in the formation of emulsification which makes the interfacial polymerization difficult.

Although there are no critical limitations to the polymerization conditions, the polymerization can be preferably effected at a temperature of 0° C. to 90° C., more preferably 20° C. to 30° C., for several hours to 24 hours.

After the reaction is completed, the resultant oil layer and the aqueous layer are separated and the above organic halogen compound added to the oil layer to lower the viscosity, followed by washing with water. The resultant product is then poured into, for example, methanol or acetone, the precipitated products are filtered and dried, and thus the desired polyesters are produced.

As explained above and in the following Examples, according to the present invention, heat-resistant polyesters having a glass transition temperature of 170° C. to 320° C., a tensile strength of 6 kg/mm$^2$ or more, and an inherent viscosity of 0.8 dl/g or more, which are capable of molding and processing can be unexpectedly provided, although it is known in the art that it is difficult to mold and process the polyester. Accordingly, molded products composed of polyesters having properties or characteristics comparable to or superior to those of products now on market as various mechanical parts, electric parts, and the like can be provided at a lower cost. Furthermore, the present polyesters can be used as a heat-resistant adhesive.

EXAMPLES

The present invention now will be further illustrated by, but is by no means limited to, the following Examples.

EXAMPLE 1

Adipic acid/terephthalic acid (mole ratio)=80/20

A 4.04 g amount of terephthalic acid chloride and 14.6 g of adipic acid chloride were dissolved in 300 ml of 1,2-dichloroethane. Further, 8 to 15 g of sodium hydroxide was dissolved in 1000 ml of water, followed by dissolving 35 g of 9,9-bis(4-hydroxyphenyl)fluorene and 15 g of tetraethyl ammonium chloride therein. The resultant solution was added all at once to the above-prepared organic solvent solution of the acid component while vigorously stirring, and the resultant mixture was allowed to react at room temperature for 10 to 15 hours. After completing the reaction, the aqueous phase was separated and 200 ml of 1,2-dichloroethane was added to the oily layer to lower the viscosity.

The resultant solution was washed three times with 500 ml of water and the solution was poured into acetone. The precipitate was then recovered by filtration, followed by drying, and thus the desired polyester was obtained.

The results of the physical property tests thereof are shown in Table 1.

EXAMPLE 2

A 100 millimole amount of a mixture of terephthalic acid chloride adipic acid chloride having a mole ratio of 1/99 to 99/1 was dissolved in 300 ml of 1,2-dichloroethane, followed by adding thereto an aqueous solution of 9,9-bis(4-hydroxyphenyl)fluorene used in Example 1, while vigorously stirring. The polyester was then produced in the same manner as in Example 1. The results are shown in Table 1.

EXAMPLE 3

The polyester was produced in the same manner as in Example 1, except that isophthalic acid chloride was used instead of the terephthalic acid chloride, and that the mole ratio of the adipic acid/isophthalic acid was 90/10.

The decomposition temperature was 360° C., the glass transition temperature was 200° C., and the inherent viscosity was 0.65 dl/g. The physical test results thereof are shown in Table 1.

EXAMPLE 4

The polyesters were produced in the same manner as in Example 1, except that an equal amount of succinic acid chloride, glutaric acid chloride, pimeric acid chloride, or suberic acid chloride was used instead of the adipic acid chloride. The decomposition temperature was 284° C., 259° C., 210° C. or 200° C., respectively, the decomposition temperature was 400° C., 400° C., 350° C., or 345° C., respectively, and the inherent viscosity was 0.73, 0.80, 0.65, and 0.66 dl/g, respectively.

The physical test results thereof are shown in Table 1.

The methods of determining the physical properties set forth in Table 1 are as follows:

1. Tensile strength . . . a film 10 mmW×100 mmL was used and the tensile strength thereof determined by an Autograph DSS 2000 manufactured by Shimazu Seisakusho, Japan.
2. Tensile modulus . . . Same as above
3. Tensile elongation at break . . . Same as above
4. Decomposition temperature . . . determined by using a Metler thermal analysis system TA 3000
5. Glass transition temperature . . . Same as above
6. Volume resistivity . . . determined by using a film having a tin foil adhered thereto as an electrode according to the method of Japanese Industrial Standard (JIS) C 2318.
7. Dielectric constant, dielectric dissipation factor . . . same as above
8. Dielectric breakdown strength . . . determined by holding a film between electrodes in the form of rods
9. Refractive index . . . determined by an Atago refractometer
10. Overall light transmission . . . determined according to the method of JIS K 7105
11. Yellowness . . . determined according to the method of JIS K 7103
12. Haze . . . determined according to the method of JIS K 7105
13. Water absorption . . . determined after drying at 120° C. for more than 10 hours, followed by dipping in ion-exchanged water at 23° C. for 24 hours
14. Solubility . . . determined by dissolving 1 g of polymer in 5 ml of a solvent
15. Inherent viscosity . . . the viscosity of a solution of 0.5 g of polyester in 100 ml of a mixture of 60% by weight of phenol and 40% by weight of 1,1,2,2-tetrachloroethane, at a temperature of 30° C., was determined.

TABLE 1

|  | Example 1 | Example 2[*1] | Example 3[*2] | Example 4[*3] |
|---|---|---|---|---|
| Mechanical Properties | | | | |
| Tensile Strength (23° C.) (kg/mm$^2$) | 5.93–6.0 | 5.8 | 5.6 | 4.9 |
| Tensile modulus (23° C.) (kg/mm$^2$) | 270 | 280 | 270 | 250 |
| Tensile elongation at break (23° C.) (%) | 2.7 | 4.0 | 3.7 | 4.2 |

TABLE 1-continued

|  | Example 1 | Example 2*1 | Example 3*2 | Example 4*3 |
| --- | --- | --- | --- | --- |
| Thermal Properties | | | | |
| Decomposition temp. (°C.) | 385 | See FIG. 1 | 370 | 350 |
| Glass transition temp. (°C.) | 220–225 | " | 180 | 160 |
| Electric Properties | | | | |
| Volume resistivity (23° C., 100 V) (Ω · cm) | $1.5 \times 10^{14}$ | $1.0 \times 10^{14}$ | $2.3 \times 10^{14}$ | $2.0 \times 10^{14}$ |
| Volume resistivity (200° C., 100 V) (Ω · cm) | $2.1 \times 10^{13}$ | — | — | — |
| Dielectric constant (23° C., 1 MHZ) | 3.27 | 3.27 | 3.22 | 3.04 |
| Dielectric dissipation factor (23° C., 1 MHZ) | 0.022 | 0.023 | 0.021 | 0.024 |
| Dielectric breakdown strength (23° C.) (KV/mm) | 107 | 110 | 98 | 96 |
| Optical Properties | | | | |
| Refractive index | 1.636 | 1.635 | 1.633 | 1.637 |
| Overall light transmittance (%) | 91.6 | 90.5 | 91.0 | 90.5 |
| Yellowness | 3.4 | 2.7 | 2.5 | 2.8 |
| Haze | 0.9 | 0.6 | 0.9 | 0.8 |
| Chemical Properties | | | | |
| Water absorption (23° C., 24 hr) | 0.78 | Same as Ex. 1 | Same as Ex. 1 | Same as Ex. 1 |
| Solubility | Dichloroethane | " | " | " |
|  | Chloroform | " | " | " |
|  | N—Methyl pyrrolidone | " | " | " |
|  | DMAC | " | " | " |
|  | DMF | " | " | " |
| Inherent viscosity (dl/g) | 0.69 | 0.64 | 0.55 | 0.49 |

*1Results obtained when ratio of adipic acid/terephthalic acid was 90/10 are shown. The results obtained in other mole ratios are similar except for the decomposition temperature and glass transition temperature.
*2Results obtained when the mole ratio of adipic acid/isophthalic acid as 90/10
*3Results obtained when the mole ratio of glutaric acid/terephthalic acid was 80/20

I claim:

1. A heat-resistant polyester having a structure represented by the formula (I):

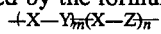 (I)

wherein X represents the structure (A):

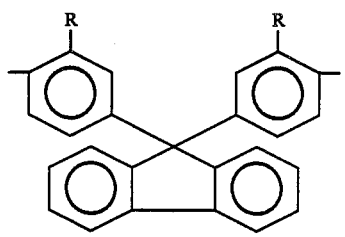 (A)

wherein R represents hydrogen, methyl, or ethyl, Y represents the structure (B):

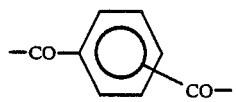 (B)

Z represents the structure (C):

 (C)

wherein l is an integer of 2 to 6, and m and n are independent repeating numbers, the mole ratio of Y component and Z component in the formula (I) being 1/99 to 99/1 and said polyester having an inherent viscosity ($\eta_{inh}$) of at least 0.6 dl/g as determined at a temperature of 30° C. in a solution of 0.5 g of the polyester in 100 ml of a mixture of 60% by weight of phenol and 40% by weight of 1,1,2,2-tetrachloroethane.

2. A heat-resistant polyester as claimed in claim 1, wherein the Y component represents the structure

3. A heat-resistant polyester as claimed in claim 1, wherein the Y component represents the structure:

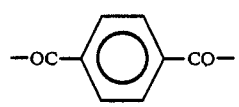

and the Z component represents the structure:

4. A heat-resistant polyester as claimed in claim 1, wherein the mole ratio of the Y component to the Z component 1/99 to 60/40.

* * * * *

UNITED STATES PATENT AND TRADEMARK OFFICE
CERTIFICATE OF CORRECTION

PATENT NO. : 4,810,771
DATED : March 7, 1989
INVENTOR(S) : T. Teramoto, et al.

It is certified that error appears in the above-identified patent and that said Letters Patent is hereby corrected as shown below:

Column 1, line 65, change "$(X)Y_m(X(Z_n)$" to
-- $(X-Y)_m (X-Z)_n$ --

Signed and Sealed this

Tenth Day of October, 1989

Attest:

DONALD J. QUIGG

*Attesting Officer*          *Commissioner of Patents and Trademarks*